(12) United States Patent
Lawson et al.

(10) Patent No.: US 7,534,839 B2
(45) Date of Patent: May 19, 2009

(54) SEQUENTIALLY TERMINATED ELASTOMERS

(75) Inventors: David F. Lawson, Uniontown, OH (US); Christine Rademacher, Akron, OH (US); Christopher Robertson, Akron, OH (US)

(73) Assignee: Bridgestone Corporation, Chuo-ku, Tokyo (JP)

( * ) Notice: Subject to any disclaimer, the term of this patent is extended or adjusted under 35 U.S.C. 154(b) by 57 days.

(21) Appl. No.: 10/560,151

(22) PCT Filed: Jun. 9, 2004

(86) PCT No.: PCT/US2004/018286

§ 371 (c)(1),
(2), (4) Date: Dec. 9, 2005

(87) PCT Pub. No.: WO2004/111094

PCT Pub. Date: Dec. 23, 2004

(65) Prior Publication Data

US 2006/0135701 A1 Jun. 22, 2006

Related U.S. Application Data

(60) Provisional application No. 60/477,013, filed on Jun. 9, 2003.

(51) Int. Cl.
| | |
|---|---|
| C08C 19/12 | (2006.01) |
| C08C 19/20 | (2006.01) |
| C08C 19/22 | (2006.01) |
| C08C 19/25 | (2006.01) |
| C08C 19/30 | (2006.01) |
| C08F 8/30 | (2006.01) |

(52) U.S. Cl. ............. 525/331.9; 525/332.3; 525/332.9; 525/342; 525/351; 525/359.2; 525/359.3; 525/375; 525/376; 525/377; 525/383; 525/385; 524/572; 524/575; 524/576

(58) Field of Classification Search ............... 525/331.9, 525/332.3, 332.9, 342, 351, 359.2, 359.3, 525/375, 376, 377, 383, 385; 524/572, 575, 524/576
See application file for complete search history.

(56) References Cited

U.S. PATENT DOCUMENTS

| | | | |
|---|---|---|---|
| 3,109,871 A | 11/1963 | Zelinski et al. | |
| 3,135,716 A | 6/1964 | Uraneck et al. | |
| 4,567,225 A | 1/1986 | Misawa et al. | |
| 4,614,771 A | 9/1986 | Watanabe et al. | |
| 4,616,069 A | 10/1986 | Watanabe et al. | |
| 4,647,625 A | 3/1987 | Aonuma et al. | |
| 4,677,165 A | 6/1987 | Kikuchi et al. | |
| 4,742,117 A | 5/1988 | Tsutsumi et al. | |
| 4,786,680 A | 11/1988 | Suzuki et al. | |
| 4,824,900 A | 4/1989 | Sakurai | |
| 4,824,908 A | 4/1989 | Tsutsumi et al. | |
| 4,927,887 A * | 5/1990 | Tate et al. | 525/279 |
| 5,064,907 A | 11/1991 | Bronstert et al. | |
| 5,066,721 A | 11/1991 | Hamada et al. | |
| 5,115,006 A | 5/1992 | Watanabe et al. | |
| 5,115,035 A | 5/1992 | Shiraki et al. | |
| 5,227,425 A | 7/1993 | Rauline | |
| 5,310,798 A | 5/1994 | Lawson et al. | |
| 5,387,631 A | 2/1995 | Kawakami et al. | |
| 5,409,969 A | 4/1995 | Hamada | |
| 5,508,333 A | 4/1996 | Shimizu | |
| 5,665,812 A | 9/1997 | Gorce et al. | |
| 5,811,479 A | 9/1998 | Labauze | |
| 5,821,290 A | 10/1998 | Labauze | |
| 5,925,713 A | 7/1999 | Labauze | |
| 5,977,238 A | 11/1999 | Labauze | |
| 5,990,257 A | 11/1999 | Johnston et al. | |
| 6,197,912 B1 | 3/2001 | Huang et al. | |
| 6,204,322 B1 | 3/2001 | Labauze | |
| 6,211,278 B1 | 4/2001 | Vanel | |
| 6,235,819 B1 | 5/2001 | Lawson et al. | |
| 6,362,272 B1 | 3/2002 | Tadaki et al. | |
| 6,369,167 B1 | 4/2002 | Morita et al. | |
| 6,841,648 B2 * | 1/2005 | Grun et al. | 528/31 |
| 2005/0070672 A1* | 3/2005 | Ozawa et al. | 525/331.9 |
| 2006/0173138 A1 | 8/2006 | Hogan et al. | |
| 2007/0054995 A1 | 3/2007 | Hogan et al. | |
| 2007/0149744 A1 | 6/2007 | Yan et al. | |

FOREIGN PATENT DOCUMENTS

WO    WO 03046020    *    6/2003

OTHER PUBLICATIONS

English Abstract of Japanese Publication No. JP61268702 (Nov. 28, 1986).

* cited by examiner

Primary Examiner—Roberto Rábago
(74) Attorney, Agent, or Firm—Arthur M. Reginelli; Meredith E. Hooker

(57) ABSTRACT

Anionically-polymerized living polymers are sequentially functionalized with certain agents X' and Y'. A method of preparing a functionalized polymer comprising the steps of reacting the polymer with a functionalizing agent X', and then further reacting the polymer with a functionalizing agent Y'.

14 Claims, No Drawings

SEQUENTIALLY TERMINATED ELASTOMERS

This application gains benefit from U.S. Patent Provisional Application No. 60/477,013, filed Jun. 9, 2003, and PCT/US04/18286, filed Jun. 9, 2004.

FIELD OF THE INVENTION

This invention relates to functionalized polymers containing carbon black-reactive and silica-reactive functionalities and methods for making the same. The functionalized polymers are useful in fabricating tires.

BACKGROUND OF THE INVENTION

In the art of making tires, it is desirable to employ rubber vulcanizates that demonstrate reduced hysteresis loss, i.e., less loss of mechanical energy to heat. Hysteresis loss is often attributed to polymer free ends within the cross-linked rubber network, as well as the disassociation of filler agglomerates. The proportion of bound rubber within the vulcanizate is also important, as increased bound rubber provides better wear resistance.

Functionalized polymers have been employed to reduce hysteresis loss and increase bound rubber. The functional group of the functionalized polymer is believed to interact with a filler particle and thereby reduce the number of polymer free ends. Also, the interaction between the functional group and the filler particles reduces filler agglomeration, which thereby reduces hysteretic losses attributable to the disassociation of filler agglomerates (i.e., Payne effect).

Conjugated diene monomers are often anionically polymerized by using alkyllithium compounds as initiators. Selection of certain alkyllithium compounds can provide a polymer product having functionality at the head of the polymer chain. A functional group can also be attached to the tail end of an anionically-polymerized polymer by terminating a living polymer with a functionalized compound.

For example, trialkyltin chlorides, such as tributyl tin chloride, have been employed to terminate the polymerization of conjugted dienes, as well as the copolymerization of conjugated dienes and vinyl aromatic monomers, to produce polymers having a trialkyltin functionality at the tail end of the polymer. These polymers have proven to be technologically useful in the manufacture of tire treads that are characterized by improved traction, low rolling resistance, and improved wear.

Because functionalized polymers are advantageous, especially in the preparation of tire compositions, there exists a need for additional functionalized polymers. Moreover, because precipitated silica has been increasingly used as reinforcing particulate filler in tires, functionalized elastomers having affinity to silica filler are needed.

SUMMARY OF THE INVENTION

In general the present invention provides a method for preparing a sequentially functionalized polymer, the method comprising reacting an anionically polymerized living polymer with a functionalizing agent X' to produce an end-functionalized polymer that will react or interact with carbon black, silica, or both and that comprises a reactive electrophilic or nucleophilic site, and reacting the reactive site with a functionalizing agent Y' to produce a sequentially functionalized polymer that will react or interact with carbon black and silica.

The present invention also includes a vulcanizate prepared by vulcanizing a rubber formulation comprising at least one vulcanizable rubber and a filler, where the at least one vulcanizable rubber is a sequentially functionalized polymer that is prepared by reacting an anionically polymerized living polymer with a functionalizing agent X' to produce an end-functionalized polymer that will react or interact with carbon black, silica, or both and that comprises a reactive electrophilic or nucleophilic site, and reacting the reactive site with a functionalizing agent Y' to produce a sequentially functionalized polymer that will react or interact with carbon black and silica.

The present invention further includes a functionalized polymer defined by the formula

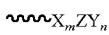$X_m Z Y_n$ where ∼∼∼ is an anionically polymerized polymer segment, X comprises a first functional group that will react or interact with carbon black, silica, or both, Y comprises a second functional group that will react or interact with carbon black, silica, or both, Z is a bond or a chain-extending group, and m and n are each integers from 1 to about 50, with the proviso that when X will react or interact with carbon black but not with silica, Y will react or interact with silica, and when X will react or interact with silica but not with carbon black, Y will react or interact with carbon black.

DETAILED DESCRIPTION OF ILLUSTRATIVE EMBODIMENTS

This invention includes functionalized polymers defined by the formula

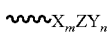$X_m Z Y_n$ where ∼∼∼ is an anionically polymerized polymer, X comprises a functional group that will react or interact with carbon black, silica, or both, Y comprises a functional group that will react or interact with carbon black, silica, or both, Z is a bond or a chain extending group, and m and n are each integers from 1 to about 50. The chain extending group is preferably a hydrocarbylene group. Suitable hydrocarbylene groups include alkylene, cycloalkylene, substituted alkylene, substituted cycloalkylene, alkenylene, cycloalkenylene, substituted alkenylene, substituted cycloalkenylene, arylene, and substituted arylene groups. The chain-extending group preferably contains from 1 carbon atom, or the appropriate minimum number of carbon atoms to form the group, up to about 100 carbon atoms, more preferably up to about 75 carbon atoms, even more preferably up to about 50 carbon atoms, still more preferably up to about 25 carbon atoms. The hydrocarbylene groups may contain heteroatoms such as, but not limited to, nitrogen, oxygen, silicon, sulfur, and phosphorus atoms.

The interaction of X or Y with the filler may occur via chemical reaction, resulting in an ionic or covalent bond between the functional group and the filler particle. Alternately, the interaction of X or Y with the filler may occur via through-space interaction (e.g., hydrogen bonding, van der Waals interaction, etc.). The interaction may be an attraction that creates a domain within the rubber matrix of the polymer. The interaction may be an affinity toward filler particles that is activated after processing of a vulcanized rubber formulation, e.g. during cure.

Functional groups that will react or interact with carbon black include polar groups, basic groups, and highly aromatic groups.

Functional groups that will react or interact with silica include basic groups and groups capable of forming hydrogen bonds, such as hydroxyl, polyalkylene glycol, epoxy, alkoxy silane, and carboxylic acid groups. Some functional groups will react or interact with both carbon black and silica.

Preferably, due to the combined presence of X and Y, the functionalized polymer will react or interact with both carbon black and silica. In one embodiment, when X comprises a functional group that will react or interact with carbon black but not as advantageously with silica and Y comprises a functional group that will react or interact with silica. In another embodiment, X comprises a functional group that will react or interact with silica but not as advantageously with carbon black and Y comprises a functional group that will react or interact with carbon black.

In one embodiment, the functionalized polymers of this invention are prepared by using a sequential process. An anionically polymerized living polymer may be reacted with a functionalizing agent X' to produce an end-functionalized polymer that can be represented by the formula

where ∿∿∿ is an anionically polymerized polymer, X and * are the residue of the reaction between the polymer and X', * is a reactive electrophilic or nucleophilic site, and m is an integer from 1 to about 50. The reactive site * may be reacted with a functionalizing agent Y' to produce a sequentially functionalized polymer that can be represented by the formula

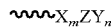

where ∿∿∿X and m are as described above, Z is a bond, Y is the residue of the reaction between * and Y', and n is an integer from 1 to about 50.

Compounds useful as the functionalizing agent X' include electrophilic compounds that will undergo an addition reaction with a living polymer to form an end-functionalized polymer that comprises a first site that will react or interact with carbon black and/or silica filler, and a second reactive site * that is electrophilic or nucleophilic.

Examples of suitable X' functionalizing agent include 1,3-dimethylimidazolidinone (DMI), N-methylpyrrolidinone (NMP), carbodiimides such as dicyclohexylcarbodiimide (DCC), benzonitrile or other substituted nitrites, substituted aziridines, thiazolines, dialkylaminobenzaldehydes, bis(dialkylamino)benzophenones, substituted epoxy compounds, N-methylcaprolactam, substituted Schiff bases, substituted styrylmethyl derivatives, vinyl pyridine, short blocks of polyvinylpyridine, polysulfoxides, poly(carbodiimides), poly (meth)acrylamides, poly(aminoalkyl(meth)acrylates), polyacrylonitrile, polyethylene oxide (PEO), butyl glycidyl ether, diphenyl ethylene, functionalized styrene, monoglycidyl siloxanes, and polysiloxanes having epoxide endgroups. Examples of monoglycidyl siloxanes include 3-glycidoxypropyltrimethoxysilane (GPMOS). Examples of polysiloxanes having epoxide endgroups include monoglycidyl etherterminated polysiloxanes such as monoglycidyl ether terminated poly(dimethylsiloxane). Many of these compounds are available from Aldrich Chemical Company.

In one embodiment, reactive site * may react with one or more additional X' functionalizing agents. In this embodiment, at least the terminal X residue comprises a reactive site *. This polymer terminus can be exemplified by the formula

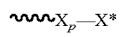

where ∿∿∿, X, and * are as described above, and p is an integer from 1 to about 49.

In one embodiment, where X' is diphenyl ethylene or a functionalized styrene, the functionalized polymer can further polymerize conjugated diene or vinyl aromatic monomer at reactive site * to thereby extend the polymer chain and provide a polymer spacer between the X and Y functional groups.

In an alternate embodiment, the electrophilic or nucleophilic site * of the X portion of the polymer is selectively reactive, i.e. will react with certain reagents, including additional X' functionalizing agent or Y' functionalizing agent, but will preferably not react to a substantial extent with conjugated diene or vinyl aromatic monomer to continue propagation of the polymer.

Preferably, the end-functionalized polymer is formed by reacting an X' functionalizing agent with an anionically polymerized living polymer. Suitable anionically-polymerized living polymers can be formed by reacting anionic initiators with certain unsaturated monomers to propagate a polymeric segment having a living or reactive end. Anionic polymerization is further described in George Odian, *Principles of Polymerization*, ch. 5 (3$^{rd}$ Ed. 1991), or Panek, 94 J. Am. Chem. Soc., 8768 (1972), which are incorporated herein by reference.

Monomers that can be employed in preparing an anionically polymerized living polymer include any monomer capable of being polymerized according to anionic polymerization techniques. These monomers include those that lead to the formation of elastomeric homopolymers or copolymers. Suitable monomers include, without limitation, conjugated $C_4$-$C_{12}$ dienes, $C_8$-$C_8$ monovinyl aromatic monomers, and $C_6$-$C_{20}$ trienes. Examples of conjugated diene monomers include, without limitation, 1,3-butadiene, isoprene, 1,3-pentadiene, 2,3-dimethyl-1,3-butadiene, and 1,3-hexadiene. A non-limiting example of trienes includes myrcene. Aromatic vinyl monomers include, without limitation, styrene, ∀-methyl styrene, p-methylstyrene, and vinylnaphthalene. When preparing elastomeric copolymers, such as those containing conjugated diene monomers and aromatic vinyl monomers, the conjugated diene monomers and aromatic vinyl monomers are normally used at a ratio of 95:5 to 50:50, and preferably 95:5 to 65:35.

One preferred type of living polymer is a copolymer of styrene and 1,3-butadiene (SBR). Preferably, the styrene content of the SBR copolymer is from about 10 to about 50 percent by weight of the total polymer, and more preferably from about 18 to about 40 percent by weight of the total polymer. From about 8 to about 99 percent of the units derived from the 1,3-butadiene are preferably of the 1,2-vinyl microstructure, more preferably from about 10 to about 60 percent of the units derived from the 1,3-butadiene are of the 1,2-vinyl microstructure. Preferably, the remaining units derived from the 1,3-butadiene are in the 1,4-cis- or 1,4-trans-microstructure at a relative ratio of about 3 cis-units to 5 trans-units.

Any anionic initiator can be employed to initiate the formation and propagation of the living polymers. Preferably, the anionic initiator comprises at least one element from Group 1 or Group 2 of the Periodic Table, according to the new notation of the IUPAC, as reported in *Hawley's Condensed Chemical Dictionary*, (13$^{th}$ Ed. 1997). The elements in Groups 1 and 2 are commonly referred to as alkali metals and alkaline earth metals, respectively. More preferably, the anionic initiator comprises lithium.

Exemplary anionic initiators include, but are not limited to, alkyl lithium initiators such as n-butyl lithium, arenyllithium initiators, arenylsodium initiators, N-lithium dihydro carbon amides, aminoalkyllithiums, and alkyl tin lithiums. Other useful initiators include N-lithiohexamethyleneimide, N-lithiopyrrolidinide, and N-lithiododecamethyleneimide as well as organolithium compounds such as the alkyl lithium adducts of substituted aldimines and substituted ketimines, N-lithio salts of substituted secondary amines, and organosulfur compounds, such as sulfur-containing heterocycles. Exemplary initiators are also described in the following U.S. Pat. Nos.: 5,332,810, 5,329,005, 5,578,542, 5,393,721, 5,698,646, 5,491,230, 5,521,309, 5,496,940, 5,574,109, and 5,786,441, which are incorporated herein by reference. Preferably, the anionic polymerization is conducted in the absence of lanthanide compounds such as those used in coordination catalysis.

The amount of initiator employed in conducting anionic polymerizations can vary widely based upon the desired polymer characteristics. In one embodiment, it is preferred to employ from about 0.1 to about 100, and more preferably from about 0.33 to about 10 mmol of initiator per 100 g of monomer.

Anionic polymerizations are typically conducted in a polar solvent such as tetrahydrofuran (THF) or a nonpolar hydrocarbon such as the various cyclic and acyclic hexanes, heptanes, octanes, pentanes, their alkylated derivatives, and mixtures thereof, as well as benzene.

In order to promote randomization in copolymerization and to control vinyl content, a polar coordinator may be added to the polymerization ingredients. Amounts range between 0 and 90 or more equivalents per equivalent of lithium. The amount depends on the amount of vinyl desired, the level of styrene employed and the temperature of the polymerization, as well as the nature of the specific polar coordinator (modifier) employed. Suitable polymerization modifiers include, for example, ethers or amines to provide the desired microstructure and randomization of the comonomer units.

Compounds useful as polar coordinators include those having an oxygen or nitrogen heteroatom and a non-bonded pair of electrons. Examples include dialkyl ethers of mono and oligo alkylene glycols; "crown" ethers; tertiary amines such as tetramethylethylene diamine (TMEDA); linear THF oligomers; and the like. Specific examples of compounds useful as polar coordinators include tetrahydrofuran (THF), linear and cyclic oligomeric oxolanyl alkanes such as 2,2-bis (2'-tetrahydrofuryl) propane, di-piperidyl ethane, dipiperidyl methane, hexamethylphosphoramide, N-N'-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091, incorporated herein by reference.

Anionically polymerized living polymers can be prepared by either batch or continuous methods. A batch polymerization is begun by charging a blend of monomer(s) and normal alkane solvent to a suitable reaction vessel, followed by the addition of the polar coordinator (if employed) and an initiator compound. The reactants are heated to a temperature of from about 20 to about 200° C. and the polymerization is allowed to proceed for from about 0.1 to about 24 hours. This reaction produces a reactive polymer having a reactive or living end. Preferably, at least about 30 percent of the polymer molecules contain a living end. More preferably, at least about 50 percent of the polymer molecules contain a living end.

A continuous polymerization is begun by charging monomer(s), initiator and solvent at the same time to a suitable reaction vessel. Thereafter, a continuous procedure is followed that removes product after a suitable residence time and replenishes the reactants.

In one embodiment, the reaction to produce end-functionalized polymer can be achieved by simply mixing the X' functionalizing agent with the living polymer. In a preferred embodiment, the functionalizing agent is added once a peak polymerization temperature, which is indicative of nearly complete monomer conversion, is observed. Because live ends may self-terminate, it is especially preferred to add the functionalizing agent within about 25 to 35 minutes of the peak polymerization temperature.

The living polymer is typically contacted with X' in a solvent or diluent. The solvent is preferably one in which both the polymer and X' are soluble. In one embodiment, the reaction can occur in the same medium in which the polymerization occurred.

The amount of X' functionalizing agent is not limited, and can vary widely depending upon the functionalizing agent and the amount of functionalization desired. In one embodiment, it is preferred to employ from about 0.3 to about 1.1 equivalent of functionalizing agent per equivalent of initiator, more preferably, from about 0.4 to about 1.0 equivalents of functionalizing agent, and even more preferably from about 0.5 to about 0.9 equivalents of functionalizing agent per equivalent of initiator. It will be appreciated that these numbers are based upon the amount of initiator added to the system and may or may not reflect the amount of initiator that is associated with the polymer.

Preferably, at least about 40 percent of the polymer molecules are functionalized with the X' functionalizing agent. Even more preferably, at least about 50 percent of the polymer molecules are functionalized with the X' functionalizing agent.

Optionally, the sequentially functionalized polymer may comprise a chain extending group. In one embodiment, the chain-extended X-functionalized polymer is prepared by reacting the reactive site * of the X-functionalized polymer with a chain-extending agent to form a chain-extended polymer terminus that can be exemplified by the formula

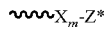

where ~~~X, m and * are as described above, and Z is a hydrocarbylene group.

In one embodiment, the chain-extended functionalized polymer is prepared by reacting the reactive site * of the X-functionalized polymer with an acrylate, acrylonitrile, or acrylamide monomer, or other monomer that will polymerize upon reaction with the reactive site *, to form a chain-extended polymer terminus.

The reactive site * is preferably reacted with a functionalizing agent Y' to produce a sequentially functionalized polymer. Compounds useful as the Y' functionalizing agent include electrophilic compounds that will undergo nucleophilic addition or substitution with the reactive site * to form a sequentially terminated polymer that can be represented by the formula

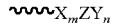

where ~~~X, and m are as described above, Z is a bond or a chain-extending group, Y is the residue of the reaction between * and Y', and n is an integer from 1 to about 50. Y preferably includes at least one site that will react or interact with carbon black and/or silica filler in a vulcanized rubber formulation. In one embodiment, Y further comprises at least one electrophilic or nucleophilic site that is selectively reactive, i.e. will react with additional Y' functionalizing agent or a monomer, but preferably will not react with conjugated diene or vinyl aromatic monomer, or at least will not react to a substantial extent. Useful monomer that will preferably react with the site include acrylates, methacrylates, acrylamides, and styrenes.

Examples of suitable Y' functionalizing compounds include silanes, alkoxy silanes, alkoxy alkyl silanes, alkoxy halo alkyl silanes, isocyanato alkoxysilanes, epoxy-generating reagents, substituted acid chlorides, substituted isocyanates, substituted benzylic and allylic halides, substituted α,β-unsaturated ketones, α,β-unsaturated esters, α,β-unsaturated amides, and bis(dialkylamino)phosphoryl chlorides. Other useful Y' compounds include functionalized acrylates, methacrylates, and styrenes as well as acrylamides.

Isocyanato alkoxysilane compounds useful as the terminators of the present invention include compounds represented by the general formula:

$$A=C=N-R^1-Si(R^2)_y(OR^3)_{3-y}$$

where A is oxygen or sulfur, $R^1$ is a divalent organic group, each $R^2$ and $R^3$ is a monovalent organic group, and y is an integer from 0 to 2. Where A is sulfur, the above formula represents an isothiocyanato alkoxysilane compound. Therefore, the designation "isocyanato alkoxysilane" also refers to isothiocyanato alkoxysilane compounds. Isocyanato alkoxysilane compounds are described, for example, in U.S. Pat. No. 4,146,585, which is incorporated herein by reference.

The divalent organic group is preferably a hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group preferably containing from 1 carbon atom, or the appropriate minimum number of carbon atoms to form the group, up to about 20 carbon atoms. These hydrocarbylene groups may contain heteroatoms such as, but not limited to, nitrogen, oxygen, silicon, sulfur, and phosphorus atoms.

The monovalent organic groups are preferably hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 20 carbon atoms. These hydrocarbyl groups may contain heteroatoms such as, but not limited to, nitrogen, oxygen, silicon, sulfur, and phosphorus atoms. The preferred monovalent organic groups are alkyl groups, having 1 to 4 carbon atoms, that preferably will not react with a living polymer.

Particularly preferred isocyanato alkoxysilane compounds include gamma-isocyanatopropyl-triethoxysilane, gamma-isothiocyanatopropyl-triethoxysilane, gamma-isocyanatopropyl-trimethoxysilane, and gamma-isothiocyanatopropyl-trimethoxysilane. Commercially available isocyanato alkoxysilane compounds include, for example, gamma-isocyanatopropyl-trimethoxysilane, which is available under the tradename Silquest A-Link 35 (General Electric OSi Corp.).

Preferred epoxy-generating reagents include epichlorohydrin, epibromohydrin, and multi-epoxidized, high-vinyl, poly- or oligo-butadienes and poly- or oligo-isoprenes.

Other preferred Y' functionalizing agents include triethoxysilyl propyl chloride, diethoxymethylsilyl propyl chloride, and N,N-diethyl amino carbonyl chloride.

Suitable Y' functionalizing agents also include short-chain living polymers having a living terminus at one end of the chain and containing a functional group at the other end of the chain. The functional group will react or interact with carbon black, silica or both. In this embodiment, the second step of the sequential functionalization comprises reacting the living polymer terminus of Y' with the reactive electrophilic site * to form a sequentially terminated polymer that can be represented by the general formula

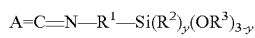$X_mZQT$ where 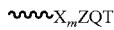X, Z and m are as described above, Q is a spacer resulting from the backbone of the short-chain living polymer, and T is the functional group that will react or interact with carbon black, silica, or both. Short-chain refers to a polymer chain of less than about 5,000 $M_n$, and preferably less than about 3,000 $M_n$.

Generally, the Y' functionalizing agent is added to the reaction mixture of X-functionalized polymer after a sufficient reaction period has occurred. Preferably, the Y' functionalizing agent is typically added within about one hour of the time that the previous reactant, i.e. the X' functionalizing agent or the chain-extending agent, is added to the polymer. Optionally, this can be delayed if necessary. More preferably, the Y' functionalizing agent is added within about 30 minutes of the time that the previous reactant is added.

The living polymer is typically contacted with Y' in a solvent or diluent. The solvent is preferably one in which both the polymer and Y' are soluble. In one embodiment, the reaction can occur in the same medium in which the polymerization occurred.

The amount of Y' functionalizing agent is not limited, and can vary widely depending upon the functionalizing agent and the amount of functionalization desired. In one embodiment, it is preferred to employ from about 0.3 to about 1 equivalent of Y' functionalizing agent per equivalent of initiator, more preferably, from about 0.4 to about 0.9 equivalents of functionalizing agent, and even more preferably from about 0.5 to about 0.8 equivalents of functionalizing agent per equivalent of initiator. It will be appreciated that these numbers are based upon the amount of initiator added to the system, and may or may not reflect the amount of initiator that is associated with the polymer.

Preferably, at least about 25 percent of the X-functionalized polymer molecules are also functionalized with the Y' functionalizing agent. More preferably, at least about 40 percent of the X-functionalized polymer molecules are also functionalized with the Y' functionalizing agent. Even more preferably, at least about 50 percent of X-functionalized polymer molecules are also functionalized with the Y' functionalizing agent.

It will be understood that the functionalization process of the present invention may result in a mixture of polymer molecules, including X-functionalized polymer molecules, X-Y-functionalized polymer molecules, and polymer molecules that are not functionalized with X or Y. The relative amounts of each of these types of polymer molecules can be adjusted to desired levels by, for example, adjusting the amounts of functionalizing agents used relative to polymer, and reaction conditions.

In one embodiment, a functionalized initiator is employed in preparing the anionically polymerized living polymer, and the sequentially functionalized polymer can be described by the general formula in it $X_mZY_n$ where 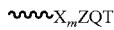X, Y, Z, m, and n are as described above, and init is a functional residue from a functionalized initiator. Preferably, init is a functionality or functional group that reacts or interacts with rubber or rubber fillers or otherwise has a desirable impact on filled rubber compositions or vulcanizates. Those groups or substituents that react or interact with rubber or rubber fillers or otherwise have a desirable impact on filler rubber compositions or vulcanizates are known and may include trialkyl tin substituents, cyclic amine groups, or sulfur-containing heterocycles. Exemplary trialkyl tin substituents are disclosed in U.S. Pat. No. 5,268,439, which is incorporated herein by reference. Exemplary cyclic amine groups are disclosed in U.S. Pat. Nos. 6,080,853, 5,786,448, 6,025,450, and 6,046,288, which are incorporated herein by reference. Exemplary sulfur-containing heterocycles are disclosed in WO 2004/020475, which is incorporated herein by reference.

After formation of the functionalized polymer, a processing aid and other optional additives such as oil can optionally be added to the polymer cement. The functionalized polymer and other optional ingredients are then isolated from the solvent and preferably dried. Conventional procedures for desolventization and drying may be employed. In one embodiment, the functionalized polymer may be isolated from the solvent by steam desolventization or hot water coagulation of the solvent followed by filtration. Residual solvent may be removed by using conventional drying techniques such as oven drying or drum drying. Alternatively, the polymer cement may be directly drum dried.

In a preferred embodiment, functionalizing agent X' is NMP, functionalizing agent Y' is gamma isocyanatopropyl-trimethoxysilane, Z is a bond, m equals 1, and n equals 1, and the sequentially terminated polymer is believed to be represented by the following general formula

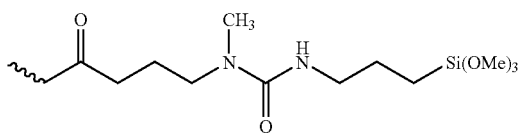

In another preferred embodiment, X' is NMP, Y' is epichlorohydrin, Z is a bond, m equals 1, and n equals 1, and the sequentially terminated polymer is believed to be represented by the following general formula

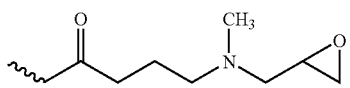

In yet another preferred embodiment, X' is DMI, Y' is gamma isocyanatopropyl-trimethoxysilane, Z is a bond, m equals 1, and n equals 1, and the sequentially terminated polymer is believed to be represented by the following general formula

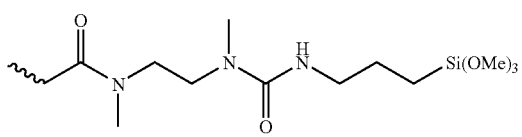

In yet a further preferred embodiment, X' is DMI, Y' is epichlorohydrin, Z is a bond, m equals 1, and n equals 1, and the sequentially terminated polymer is believed to be represented by the following general formula

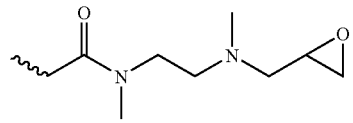

The functionalized polymers of this invention are particularly useful in preparing tire components. These tire components can be prepared by using the functionalized polymers of this invention alone or together with other rubbery polymers. In a preferred embodiment, a mixture of polymers that include X-functionalized polymer molecules, X-Y-functionalized polymer molecules, and optionally other rubbery polymers are present in the mixture. The amounts of X-functionalized polymer molecules and X-Y-functionalized polymer molecules that are present can vary widely, but preferably the ratio of X-functionalized polymer molecules to X-Y-functionalized polymer molecules in the tire formulation is from about 0.1:1 to about 5:1, more preferably 0.2:1 to about 4:1, even more preferably from about 0.5:1 to about 3:1 and still more preferably from about 0.8:1 to about 1.5:1.

Other rubbery elastomers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents may be employed, including sulfur or peroxide-based curing systems. Curing agents are described in 20 *Kirk-Othmer, Encyclopedia of Chemical Technology*, 365-468, (3$^{rd}$ Ed. 1982), particularly *Vulcanization Agents and Auxiliary Materials*, 390-402, and A. Y. Coran, *Vulcanization in Encyclopedia of Polymer Science and Engineering*, (2$^{nd}$ Ed. 1989), which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These stocks are useful for forming tire components such as treads, subtreads, black sidewalls, body ply skins, bead filler, and the like. Preferably, the functional polymers are employed in tread formulations, and these tread formulations will include from about 10 to about 100% by weight of the functionalized polymer based on the total rubber within the formulation. More preferably, the tread formulation will include from about 35 to about 90% by weight, and more preferably from about 50 to 80 % by weight of the functional polymer based on the total weight of the rubber within the formulation. The preparation of vulcanizable compositions and the construction and curing of the tire is not affected by the practice of this invention.

Preferably, the vulcanizable rubber composition is prepared by forming an initial masterbatch that includes the rubber component and filler. This initial masterbatch is mixed at a starting temperature of from about 25° C. to about 125° C. with a discharge temperature of about 135° C. to about 180° C. To prevent premature vulcanization (also known as scorch), this initial masterbatch generally excludes any vulcanizing agents. Once the initial masterbatch is processed, the vulcanizing agents are introduced and blended into the initial masterbatch at low temperatures in a final mix stage, which does not initiate the vulcanization process. Optionally, additional mixing stages, sometimes called remills, can be employed between the masterbatch mix stage and the final mix stage. Rubber compounding techniques and the additives employed therein are generally known as disclosed in Stephens, *The Compounding and Vulcanization of Rubber*, in *Rubber Technology* ($2^{nd}$ Ed. 1973). The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it is heated to about 140 to about 180° C. Cured or crosslinked rubber compositions may be referred to as vulcanizates, which generally contain three-dimensional polymeric networks that are thermoset. The other ingredients, such as processing aides and fillers, are generally evenly dispersed throughout the vulcanized network. Pneumatic tires can be made as discussed in U.S. Pat. Nos. 5,866,171, 5,876,527, 5,931,211, and 5,971,046, which are incorporated herein by reference.

In certain embodiments, the functionalized polymers of this invention provide carbon black, carbon black/silica, and silica filled-rubber vulcanizates with an advantageous balance of properties. Preferred vulcanizates exhibit reduced hysteresis loss, reduced wear, increased bound rubber, and improved wet traction. Filled-rubber vulcanizates prepared with the functionalized polymers of this invention also exhibit a reduced Payne effect in some embodiments. Excellent polymer processability, as indicated by Mooney viscosity, can also be maintained. These functionalized polymers can be readily prepared by terminating living polymers.

In order to demonstrate the practice of the present invention, the following examples have been prepared and tested. The examples should not, however, be viewed as limiting the scope of the invention. The claims will serve to define the invention.

EXAMPLES

Example 1

To a 18.9 L reactor equipped with turbine agitator blades was added 4.8 kg hexane, 1.22 kg (33 wt %) styrene in hexane, and 7.39 kg (22.1 wt %) 1,3-butadiene in hexane. To the reactor was charged 11 mL of 1.68 M butyllithium in hexane and 3.83 mL of 1.6 M 2,2'-di(tetrahydrofuryl)propane in hexane and the batch temperature was controlled at from 50° C. to about 58° C. After approximately 45 minutes, the batch was cooled to 32° C. and a measured amount of live poly(styrene-co-butadiene)cement was then transferred to a sealed nitrogen purged 800 mL bottle. The bottle contents were then terminated with 1 equivalent of isopropanol, coagulated and drum dried. NMR analysis of this base polymer indicated a styrene content of about 20 percent, a block styrene content of about 4 percent, and approximately 54 percent of the butadiene in the 1,2-configuration.

Example 2

A second measured amount of live poly(styrene-co-butadiene)cement prepared in Example 1 was transferred to a sealed nitrogen purged bottle, and to this was added 1 equivalent of 1,3-dimethylimidazolidinone (DMI) per equivalent of butyllithium. The contents of the bottle were agitated at about 50° C. for about 30 minutes. The bottle contents were then mixed with 1 equivalent of isopropanol, coagulated and drum dried.

Example 3

A third measured amount of live poly(styrene-co-butadiene)cement prepared in Example 1 was transferred to a sealed nitrogen purged bottle, and to this was added 1 equivalent of 1,3-dimethylimidazolidinone (DMI) per equivalent of butyllithium. The contents of the bottle were agitated at about 50° C. for about 30 minutes. One equivalent of isocyanatopropyl trimethoxysilane (Silquest® A-Link 35) per equivalent of butyllithium was added and the contents of the bottle were further agitated at about 50° C. for about 30 minutes. The bottle contents were then mixed with about 2 equivalents of sorbitan trioleate (STO), coagulated and drum dried.

Example 4

A fourth measured amount of live poly(styrene-co-butadiene)cement prepared in Example 1 was transferred to a sealed nitrogen purged bottle, and to this was added 1 equivalent of 1,3-dimethylimidazolidinone (DMI) per equivalent of butyllithium. The contents of the bottle were agitated at about 50° C. for about 30 minutes. One equivalent of epichlorohydrin per equivalent of butyllithium was added and the contents of the bottle were further agitated at about 50° C. for about 30 minutes. The bottle contents were then coagulated and drum dried. The polymers of Examples 1-4 were characterized as set forth in Table I.

TABLE I

| | Example No. | | | |
|---|---|---|---|---|
| | 1 | 2 | 3 | 4 |
| $M_n$ (kg/mol) | 123 | 88 | 81 | 72 |
| $M_w/M_n$ | 1.04 | 1.11 | 1.71 | 1.16 |
| $T_g$ (° C.) | −33 | −33 | −33 | −34 |

Examples 5-8

The rubber of Examples 1-4 were employed in carbon black tire formulations designated Examples 5-8, respectively. The formulations are presented in Table II.

TABLE II

| | Example No. (weight parts) | | | |
|---|---|---|---|---|
| | 5 | 6 | 7 | 8 |
| Initial Formulation | | | | |
| Rubber Example | 100 | 100 | 100 | 100 |
| Carbon Black | 55 | 55 | 55 | 55 |
| Wax | 1 | 1 | 1 | 1 |
| Antiozonant | 0.95 | 0.95 | 0.95 | 0.95 |
| Zinc Oxide | 2.5 | 2.5 | 2.5 | 2.5 |
| Stearic Acid | 2 | 2 | 2 | 2 |
| Aromatic Oil | 10 | 10 | 10 | 10 |
| Total | 171.45 | 171.45 | 171.45 | 171.45 |
| Final Formulation | | | | |
| Initial | 171.45 | 171.45 | 171.45 | 171.45 |
| Sulfur | 1.3 | 1.3 | 1.3 | 1.3 |
| Accelerators | 1.9 | 1.9 | 1.9 | 1.9 |
| Total | 174.65 | 174.65 | 174.65 | 174.65 |

Each carbon black rubber compound was prepared in two stages, which are named Initial (Masterbatch) and Final. In the initial part, the polymer from Example 1, 2, 3 or 4 was mixed with carbon black, an antiozonant, stearic acid, wax, aromatic oil, and zinc oxide, in a 65 g Banbury mixer operating at 60 RPM and 133° C. Specifically, the polymer was first placed in the mixer, and after 0.5 minutes, the remaining ingredients except the stearic acid were added. The stearic acid was then added after 3 minutes. The initials were mixed for 5-6 minutes. At the end of the mixing the temperature was approximately 165° C. The example was transferred to a mill operating at a temperature of 60° C., where it was sheeted and subsequently cooled to room temperature.

The finals were mixed by adding the initials and the curative materials to the mixer simultaneously. The initial mixer temperature was 65° C. and it was operating at 60 RPM. The final material was removed from the mixer after 2.25 minutes when the material temperature was between 100 and 105° C.

Test specimens of each rubber formulation were prepared by cutting out the required mass from an uncured sheet (about 2.5 mm to 3.81 mm thick), and cured within closed cavity molds under pressure for 15 minutes at 171° C. The test specimens were then subjected to various physical tests, and the results of these tests are reported in Table III. Mooney viscosity measurement was conducted on uncured rubber at 130° C. using a large rotor. The Mooney viscosity was recorded as the torque when the rotor has rotated for 4 minutes. The sample is preheated at 130° C. for 1 minute before the rotor starts. Modulus at 300%, and tensile strength were measured according to ASTM D 412 (1998) Method B. Dynamic properties were determined by using a RDA (Rheometrics Dynamic Analyzer). Strain sweep experiments were conducted at a frequency of 10 Hertz (Hz) and temperatures of 0 and 50°C., with strain sweeping from 0% to 10%. )G is the change in GN at 0.25% from GN at 14.75%. Payne effect (ΔG') data were obtained from the strain sweep experiment. Temperature sweep experiments were conducted with a frequency of 31.4 rad/sec using 0.5% strain for temperature ranging from −100° C. to −10° C., and 2% strain for the temperature ranging from −10° C. to 100° C.

Bound rubber, a measure of the percentage of rubber bound, through some interaction, to the filler, was determined by solvent extraction with toluene at room temperature. More specifically, a test specimen of each uncured rubber formulation was placed in toluene for three days. The solvent was removed and the residue was dried and weighed. The percentage of bound rubber was then determined according to the formula $$\% \text{ bound rubber} = (100(W_d - F))/R$$

where $W_d$ is the weight of the dried residue, F is the weight of the filler and any other solvent insoluble matter in the original sample, and R is the weight of the rubber in the original sample.

TABLE III

| | Example No. | | | |
|---|---|---|---|---|
| | 5 | 6 | 7 | 8 |
| $ML_{1+4}$ @ 130° C. | 25.5 | 43.8 | 52.9 | 42.0 |
| $t_{50}$ (min) | 3.06 | 2.32 | 2.40 | 1.95 |
| 300% Modulus @ 23° C. (MPa) | 11.66 | 14.20 | 14.19 | 15.17 |
| Tensile @ Break @ 23° C. (MPa) | 14.56 | 17.61 | 18.68 | 18.02 |
| tan δ 0.5% E (0° C.) | 0.2290 | 0.3088 | 0.2888 | 0.2920 |
| )G' (50° C.) (MPa) | 4.2749 | 0.6881 | 0.6233 | 0.6378 |
| tan δ 0.5% E (50° C.) | 0.2574 | 0.1260 | 0.1505 | 0.1675 |
| Bound Rubber (%) | 7.6 | 52.3 | 47.7 | 38.5 |

Examples 9-12

The rubber of Examples 1-4 were employed in carbon black/silica tire formulations designated as Examples 9-12, respectively. The formulations are presented in Table IV.

TABLE IV

| | Example No. (weight parts) | | | |
|---|---|---|---|---|
| | 9 | 10 | 11 | 12 |
| Initial Formulation | | | | |
| Rubber Example | 100 | 100 | 100 | 100 |
| Carbon Black | 35 | 35 | 35 | 35 |
| Silica | 30 | 30 | 30 | 30 |
| Antiozonant | 0.95 | 0.95 | 0.95 | 0.95 |
| Stearic Acid | 1.5 | 1.5 | 1.5 | 1.5 |
| Aromatic Oil | 10 | 10 | 10 | 10 |
| Total | 177.45 | 177.45 | 177.45 | 177.45 |
| Remill | | | | |
| Initial | 177.45 | 177.45 | 177.45 | 177.45 |
| Silane Shielding Agent | 4.57 | 4.57 | 4.57 | 4.57 |
| Total | 182.02 | 182.02 | 182.02 | 182.02 |
| Final Formulation | | | | |
| Initial | 182.02 | 182.02 | 182.02 | 182.02 |
| Sulfur | 1.7 | 1.7 | 1.7 | 1.7 |
| Zinc Oxide | 2.5 | 2.5 | 2.5 | 2.5 |
| Pre-Vulcanization Inhibitor | 0.25 | 0.25 | 0.25 | 0.25 |
| Accelerators | 2.0 | 2.0 | 2.0 | 2.0 |
| Total | 188.47 | 188.47 | 188.47 | 188.47 |

Each carbon black/silica rubber compound was prepared in three stages named Initial, Remill and Final. In the initial part, the polymer from Examples 1, 2, 3 or 4 was mixed with carbon black, silica, an antioxidant, stearic acid, and aromatic oil in a 65 g Banbury mixer operating at 60 RPM and 133° C. Specifically, the polymer was first placed in the mixer, and after 0.5 minutes, the remaining ingredients except the stearic acid were added. The stearic acid was then added after 3 minutes. The initials were mixed for 5-6 minutes. At the end of the mixing the temperature was approximately 165° C. The sample was cooled to less that about 95° C. and transferred to a remill mixer.

In the remill stage, the initial formulation and silane shielding agent were simultaneously added to a mixer operating at about 60 RPM. The shielding agent employed in these examples was EF(DiSS)-60, available from Rhein Chemie Corp. The starting temperature of the mixer was about 94° C. The remill material was removed from the mixer after about 3 minutes, when the material temperature was between 135 and 150° C.

The finals were mixed by adding the remills, zinc oxide and the curative materials to the mixer simultaneously. The initial mixer temperature was 65° C. and it was operating at 60 RPM. The final material was removed from the mixer after 2.25 minutes when the material temperature was between 100 and 105° C. Test specimens were prepared and subjected to various physical tests as for Examples 5-8 above. The results of these tests are reported in Table V.

TABLE V

| | Example No. | | | |
|---|---|---|---|---|
| | 9 | 10 | 11 | 12 |
| $ML_{1+4}$ @ 130° C. | 39.5 | 79.8 | 76.1 | 91.6 |
| $t_{50}$ (min) | 4.4 | 3.83 | 3.95 | 4.79 |
| 300% Modulus @ 23° C. (MPa) | 12.9 | 0* | 0* | 11.8 |
| Tensile @ Break @ 23° C. (MPa) | 15.7 | 14.1 | 17.1 | 15.0 |
| tan δ 0.5% E (0° C.) | 0.2138 | 0.2433 | .02769 | 0.2393 |
| )G' (50° C.) (MPa) | 5.835 | 2.012 | 1.569 | 2.786 |
| tan δ 0.5% E (50° C.) | 0.2335 | 0.1980 | 0.1667 | 0.1903 |
| Bound Rubber (%) | 24.1 | 31.5 | 45.6 | N/A |

*Sample broke prior to measurement.

Example 13

To a 19 L reactor equipped with turbine agitator blades was added 5.2 kg hexane, 1.2 kg (34 wt %) styrene in hexane, and 7.1 kg (22.5 wt %) 1,3-butadiene in hexane. To the reactor was charged 18.6 mmol butyllithium and 6.1 mmol of a polar modifier and the batch temperature was controlled at from 65° C. to about 70° C. After approximately 1½ hours, the batch was cooled to 32° C. and a measured amount of the live poly(styrene-co-butadiene)cement was transferred to a sealed nitrogen purged 800 mL bottle. The bottle contents were then terminated with 1 equivalent of isopropanol per equivalent of butyllithium, coagulated and drum dried.

Example 14

A live poly(styrene-co-butadiene)cement was prepared as in Example 13 and transferred to a sealed nitrogen purged bottle, and to this was added 1 equivalent of 3-glycidoxypropyltrimethoxysilane (GPMOS) per equivalent of butyllithium. The contents of the bottle were agitated at about 50° C. for about 30 minutes. A measured amount of the GPMOS terminated polymer was then mixed with 1 equivalent of isopropanol, coagulated and drum dried.

Examples 15-16

To a 19 L reactor equipped with turbine agitator blades was added 7.0 kg hexane and 7.0kg (21 wt %) 1,3-butadiene in hexane. To the reactor was charged 76 mmol tributyl tin lithium and 25 mmol of a polar modifier and the batch temperature was controlled at from 55° C. to about 60° C. After approximately 1½ hours, the batch was cooled to 32° C. A measured amount of the tributyl tin butadiene lithium cement was transferred to a sealed nitrogen purged 800 mL bottle containing a measured amount of the GPMOS terminated polymer prepared in Example 14. The amount of tributyl tin butadiene lithium transferred was 1 equivalent per GPMOS terminated polymer for Example 15 and 2 equivalents for per GPMOS terminated polymer Example 16. The content of the each bottle was agitated at 50° C. for 1 hour, isolated, and drum dried.

The polymers of Examples 13-16 were characterized as set forth in Table VI.

TABLE VI

| | Example No. | | | |
|---|---|---|---|---|
| | 13 | 14 | 15 | 16 |
| $M_n$ (kg/mol) | 111 | 153 | 219 | 167 |
| $M_w/M_n$ | 1.04 | 1.21 | 2.76 | 3.97 |
| $T_g$ (° C.) | −35.5 | −35.5 | −35.5 | −35.5 |
| Sn (ppm) | N/A | N/A | 918 | 1474 |
| Si (ppm) | N/A | 501 | 578 | 431 |

Examples 17-20

The rubber of Examples 13-16 were employed in carbon black tire formulations as for Examples 5-8. Specifically, the rubber of Example 13 was employed in Example 17, Example 14 was employed in Example 18, Example 15 was employed in Example 19, and Example 16 was employed in Example 20.

Test specimens were prepared and subjected to various physical tests as for Examples 5-8 above. The results of these tests are reported in Table VII.

TABLE VII

| | Example No. | | | |
|---|---|---|---|---|
| | 17 | 18 | 19 | 20 |
| $ML_{1+4}$ @ 130° C. | 21.5 | 51.8 | 67.6 | 63.6 |
| MH-ML @ 171° C. (kg-cm) | 16.99 | 17.63 | 16.10 | 16.09 |
| $t_{50}$ @ 171° C. (min) | 3.1 | 2.8 | 2.8 | 2.8 |
| 300% Modulus @ 23° C. (MPa) | 10.71 | 13.92 | 13.83 | 14.20 |
| Tensile Strength @ 23° C. (MPa) | 13.67 | 18.29 | 16.98 | 18.22 |
| Temp. Sweep tan δ 0.5% E, 5 Hz, 0° C. | 0.235 | 0.257 | .262 | 0.260 |
| Temp. Sweep tan δ 2% E, 5 Hz, 50° C. | 0.281 | 0.232 | 0.214 | 0.217 |
| Strain Sweep RDA tan δ 5% E, 1 Hz, 50° C. | 0.275 | 0.185 | 0.168 | 0.165 |
| )G' (50° C.) (MPa) | 5.124 | 2.299 | 1.911 | 1.781 |
| Bound Rubber (%) | 22.1 | 30.2 | 32.7 | 31.7 |

Examples 21-24

The rubber of Examples 13-16 were employed in carbon black/silica tire formulations Examples 21-24, respectively. The formulations were mixed as described above for Examples 9-12.

Test specimens were prepared and subjected to various physical tests as for Examples 9-12 above. The results of these tests are reported in Table VIII.

TABLE VIII

| | Example No. | | | |
|---|---|---|---|---|
| | 21 | 22 | 23 | 24 |
| $ML_{1+4}$ @ 130° C. | 55.5 | 98.5 | 96.6 | 92.6 |
| MH-ML @ 171° C. (kg-cm) | 23.14 | 16.84 | 16.75 | 17.01 |
| $t_{50}$ @ 171° C. (min) | 7.8 | 5.8 | 6.2 | 5.8 |
| 300% Modulus @ 23° C. (MPa) | 8.76 | 13.46 | 12.88 | 13.17 |
| Tensile Strength @ 23° C. (MPa) | 12.13 | 15.31 | 15.40 | 15.16 |
| Temp. Sweep tan δ 0.5% E, 5 Hz, 0° C. | 0.214 | 0.297 | 0.291 | 0.284 |
| Temp. Sweep tan δ 2% E, 5 Hz, 50° C. | 0.241 | 0.163 | 0.172 | 0.172 |
| Strain Sweep RDA tan δ 5% E, 1 Hz, 50° C. | 0.244 | 0.156 | 0.158 | 0.160 |
| )G' (50° C.) (MPa) | 7.529 | 1.847 | 1.747 | 1.741 |
| Bound Rubber (%) | 21.7 | 78.6 | 75.0 | 72.6 |

Example 25

A live poly(styrene-co-butadiene)cement was prepared as in Example 1, and a measured amount was terminated with 1 equivalent of isopropanol, coagulated and drum dried. The Tg of the polymer was about −31.1° C.

Example 26

A second measured amount of the live poly(styrene-co-butadiene)cement prepared in Example 25 was transferred to a sealed nitrogen purged bottle, and to this was added 0.9 equivalent of 1,3-dimethylimidazolidinone (DMI) per equivalent of butyllithium. The contents of the bottle were agitated at about 50° C. for about 30 minutes. The bottle contents were then mixed with 1 equivalent of isopropanol, coagulated and drum dried.

Example 27

A third measured amount of live poly(styrene-co-butadiene)cement prepared in Example 25 was transferred to a sealed nitrogen purged bottle, and to this was added 0.9 equivalent of 1,3-dimethylimidazolidinone (DMI) per equivalent of butyllithium. The contents of the bottle were agitated at about 50° C. for about 30 minutes. Approximately 0.9 equivalent of triethoxysilyl propyl chloride per equivalent of butyllithium was added and the contents of the bottle were further agitated at about 50° C. for about 30 minutes. The bottle contents were then mixed with about 2 equivalents of sorbitan trioleate (STO), coagulated and drum dried.

Example 28

A fourth measured amount of live poly(styrene-co-butadiene)cement prepared in Example 25 was transferred to a sealed nitrogen purged bottle, and to this was added 0.9 equivalent of 1,3-dimethylimidazolidinone (DMI) per equivalent of butyllithium. The contents of the bottle were agitated at about 50° C. for about 30 minutes. Approximately 0.9 equivalent of diethoxymethylsilyl propyl chloride per equivalent of butyllithium was added and the contents of the bottle were further agitated at about 50° C for about 30 minutes. The bottle contents were then coagulated and drum dried.

Example 29

A fifth measured amount of live poly(styrene-co-butadiene)cement prepared in Example 25 was transferred to a sealed nitrogen purged bottle, and to this was added 0.9 equivalent of monoglycidyl ether terminated poly(dimethylsiloxane) having an average molecular weight $M_n$ of about 5000. The contents of the bottle were agitated at about 50° C. for about 30 minutes. Approximately 0.9 equivalent of diethylcarbamyl chloride per equivalent of butyllithium was added and the contents of the bottle were further agitated at about 50° C. for about 30 minutes. The bottle contents were then coagulated and drum dried.

Example 30

A sixth measured amount of live poly(styrene-co-butadiene)cement prepared in Example 25 was transferred to a sealed nitrogen purged bottle, and to this was added 0.9 equivalent of monoglycidyl ether terminated poly(dimethylsiloxane) having an average molecular weight $M_n$ of about 5000. The contents of the bottle were agitated at about 50° C. for about 30 minutes. Approximately 0.9 equivalent of 1-(3-bromopropyl)-2,2,5,5-tetramethyl-1-aza-2,5-disilacyclopentane per equivalent of butyllithium was added and the contents of the bottle were further agitated at about 50° C. for about 30 minutes. The bottle contents were then coagulated and drum dried. The polymers of Examples 25-30 were characterized as set forth in Table IX.

TABLE IX

| | Example No. | | | | | |
|---|---|---|---|---|---|---|
| | 25 | 26 | 27 | 28 | 29 | 30 |
| $M_n$ (kg/mol) | 113 | 122 | 112 | 114 | 123 | 115 |
| $M_w/M_n$ | 1.05 | 1.09 | 1.04 | 1.07 | 1.1 | 1.04 |
| Coupling (%) | none | 13 | 3 | 7 | 14 | 3 |

Examples 31-36

The rubber of Examples 25-30 were employed in carbon black tire 5 formulations Examples 31-36, respectively. The formulations were mixed as described above for Examples 5-8. Test specimens were prepared and subjected to various physical tests as for Examples 5-8 above. The results of these tests are reported in Table X.

TABLE X

| | Example No. | | | | | |
|---|---|---|---|---|---|---|
| | 31 | 32 | 33 | 34 | 35 | 36 |
| $ML_{1+4}$@130° C. | 26.67 | 41 | 41.25 | 41.47 | 32.37 | 32.97 |
| MH-ML @171° C. (kg-cm) | 18.21 | 16.48 | 16.72 | 16.64 | 17.95 | 18.61 |
| $t_{50}$ @171° C. (min) | 3.6 | 2.35 | 2.15 | 2.3 | 3.3 | 3.3 |
| 300% Modulus @23° C. (MPa) | 11.17 | 14.5 | 14.91 | 13.84 | 10.02 | 12.22 |

TABLE X-continued

|  | Example No. | | | | | |
| --- | --- | --- | --- | --- | --- | --- |
|  | 31 | 32 | 33 | 34 | 35 | 36 |
| Tensile @ Break @23° C. (MPa) | 17.68 | 18.83 | 17.49 | 19.15 | 15.47 | 17.29 |
| Temp. Sweep tan δ @0° C. | 0.251 | 0.328 | 0.330 | 0.336 | 0.257 | 0.251 |
| Temp. Sweep tan δ @ 50° C. | 0.270 | 0.176 | 0.165 | 0.192 | 0.250 | 0.268 |
| Strain Sweep RDA tan δ 5% E, 50° C. | 0.246 | 0.119 | 0.109 | 0.116 | 0.238 | 0.225 |
| )G' @50° C. (MPa) | 4.698 | 0.789 | 0.637 | 0.654 | 4.324 | 4.293 |
| Bound Rubber (%) | 15.2 | 40.1 | 39.4 | 40.0 | 17.2 | — |

Examples 37-41

The rubber of Examples 25-29 were employed in carbon black/silica tire formulations Examples 37-41, respectively. The formulations were mixed as described above for Examples 9-12.

Test specimens were prepared and subjected to various physical tests as for Examples 9-12 above. The results of these tests are reported in Table XI.

TABLE XI

|  | Example No. | | | | |
| --- | --- | --- | --- | --- | --- |
|  | 37 | 38 | 39 | 40 | 41 |
| $ML_{1+4}$@130° C. | 65.6 | 98.6 | 99.3 | 99.7 | 91.3 |
| MH-ML @171° C. (kg-cm) | 24.13 | 17.98 | 17.06 | 18.71 | 19.69 |
| $t_{50}$ @171° C. (min) | 7.3 | 5.6 | 5.6 | 5.25 | 6.5 |
| 300% Modulus @23° C. (MPa) | 9.31 | 10.12 | 9.87 | 11.17 | — |
| Tensile @ Break @23° C. (MPa) | 13.43 | 14.74 | 15.27 | 15.97 | 15.07 |
| Temp. Sweep tan δ @0° C. | 0.218 | 0.265 | 0.263 | 0.267 | 0.286 |
| Temp. Sweep tan δ @ 50° C. | 0.232 | 0.198 | 0.194 | 0.208 | 0.188 |
| Strain Sweep RDA tan δ 5% E, 50° C. | 0.241 | 0.172 | 0.177 | 0.107 | 0.202 |
| Dynastat tan δ 50° C. | 0.226 | 0.169 | 0.170 | 0.162 | 0.188 |
| )G' @50° C. (MPa) | 7.448 | 2.870 | 2.461 | 2.725 | 3.579 |
| Bound Rubber (%) | 22.9 | 29.1 | 31.3 | 31.4 | 50.0 |

Various modifications and alterations that do not depart from the scope and spirit of this invention will become apparent to those skilled in the art. This invention is not to be duly limited to the illustrative embodiments set forth herein.

What is claimed is:

1. A vulcanizate comprising:
    a vulcanized rubber formulation comprising at least one vulcanized rubber and a filler, where the at least one vulcanized rubber includes a vulcanizate of a sequentially functionalized polymer that is prepared by
    reacting an anionically polymerized living polymer with a functionalizing agent X' to produce an end-functionalized polymer that will react or interact with carbon black, silica, or both and that comprises a reactive electrophilic or nucleophilic site; and
    reacting the reactive site with a functionalizing agent Y' to produce a sequentially functionalized polymer that will react or interact with carbon black and silica, where Y' is (i) an isocyanato alkoxy silane compound selected from the group consisting of gamma-isocyanatopropyl-triethoxysilane, gamma-isothiocyanatopropyl-triethoxysilane, gamma-isocyanatopropyl-trimethoxysilane, and gamma-isothiocyanatopropyl-trimethoxysilane (ii) an epoxy-generating reagent selected from the group consisting of epichlorohydrin, epibromohydrin, a multi-epoxidized high-vinyl polybutadiene, a multi-epoxidized high-vinyl oligo-butadiene, a multi-epoxidized high-vinyl polyisoprene, and a multi-epoxidized high-vinyl oligo-isoprene, (iii) a short-chain polymer group, (iv) triethoxysilyl propyl chloride, (v) diethoxymethylsilyl propyl chloride, (vi) N,N-diethyl amino carbamyl chloride, or (vii) 1-(3-bromopropyl)-2,2,5,5-tetramethyl-1-aza-2,5-disilacyclopentane.

2. The vulcanizate of claim 1, where the anionically polymerized living polymer is a copolymer of styrene and 1,3-butadiene.

3. The vulcanizate of claim 1, where X' selected from the group consisting of 1,3-dimethylimidazolidinone, N-methylpyrrolidinone, dicyclohexylcarbodiimide, benzonitrile, a substituted nitrile, a substituted aziridine, a thiazoline, a dialkylaminobenzaldehyde, a bis(dialkylamino)benzophenone, a substituted epoxy compound, N-methylcaprolactam, a substituted Schiff base, a substituted styrylmethyl derivative, vinyl pyridine, a short block of polyvinylpyridine, a polysulfoxide, a poly(carbodiimide), a poly(meth)acrylamide, a poly(aminoalkyl(meth)acrylate), polyacrylonitrile, polyethylene oxide, butyl glycidyl ether, monoglycidyl siloxane, polysiloxane with epoxide endgroups, diphenyl ethylene, and a functionalized styrene.

4. The vulcanizate of claim 1, where X' selected from the group consisting of 1,3-dimethylimidazolidinone, 3-glycidoxypropyltrimethoxysilane, N-methylpyrrolidinone, and monoglycidyl ether terminated poly(dimethylsiloxane).

5. The vulcanizate of claim 1, where the filler includes carbon black, silica, or a mixture thereof.

6. The vulcanizate of claim 1, where the vulcanizate further includes a vulcanized natural rubber or vulcanized synthetic rubber other than the sequentially functionalized polymer.

7. method for preparing a sequentially functionalized polymer, the method comprising:
    reacting an anionically polymerized living polymer with a functionalizing agent X' to produce an end-functionalized polymer that will react or interact with carbon black, silica, or both and that comprises a reactive electrophilic or nucleophilic site; and reacting the reactive site with a functionalizing agent Y' to produce a sequentially functionalized polymer that will react or interact with carbon black and silica, where Y' is selected from the group consisting of (i) an isocyanato alkoxy silane compound selected from the group consisting of gamma-isocyanatopropyl-triethoxysilane, gamma-isothiocyanatopropyl-triethoxysilane, gamma-isocyanatopropyl-trimethoxysilane, and gamma-isothiocyanatopropyl-trimethoxysilane (ii) an epoxy-generating reagent selected from the group consisting of a multi-epoxidized high-vinyl polybutadiene, a multi-epoxidized high-vinyl oligo-butadiene, a multi-epoxidized high-vinyl polyisoprene, and a multi-epoxidized high-vinyl oligo-isoprene, (iii) a short-chain polymer group, (iv) triethoxysilyl propyl chloride, (v) diethoxymethylsilyl propyl chloride, (vi) N,N-diethyl amino carbonyl chloride, or (vii) 1-(3-bromopropyl)-2,2,5,5-tetramethyl-1-aza-2,5-disilacyclopentane.

8. The method of claim 7, where the anionically polymerized living polymer is a copolymer of styrene and 1,3-butadiene.

9. The method of claim 7, where X' is selected from the group consisting of 1,3-dimethylimidazolidinone, N-methylpyrrolidinone, dicyclohexylcarbodiimide, benzonitrile, a substituted nitrile, a substituted aziridine, a thiazoline, a dialkylaminobenzaldehyde, a bis(dialkylamino)benzophenone, a substituted epoxy compound, N-methylcaprolactam, a substituted Schiff base, a substituted styrylmethyl derivative, vinyl pyridine, a short block of polyvinylpyridine, a polysulfoxide, a poly(carbodiimide), a poly(meth)acrylamide, a poly(aminoalkyl(meth)acrylate), polyacrylonitrile, polyethylene oxide, butyl glycidyl ether, monoglycidyl siloxane, polysiloxane with epoxide endgroups, diphenyl ethylene, and a functionalized styrene.

10. The method of claim 7, where X' is selected from the group consisting of 1,3-dimethylimidazolidinone, 3-glycidoxypropyltrimethoxysilane, N-methylpyrrolidinone, and monoglycidyl ether terminated poly(dimethylsiloxane).

11. The method of claim 7, further comprising the step of reacting the reactive site with a chain-extending group Z to form a chain-extended functionalized polymer that comprises a reactive electrophilic or nucleophilic site.

12. A method for preparing a sequentially functionalized polymer, the method comprising:

reacting an anionically polymerized living polymer with a functionalizing agent X' to produce an end-functionalized polymer that comprises a reactive electrophilic or nucleophilic site;

reacting the reactive site with a functionalizing agent Y', where at least one of X' and Y' provides the sequentially functionalized polymer with a polar group, a basic group, or an aromatic group, and where at least one of X' and Y' provides the sequentially functionalized polymer with a basic group or group capable of forming a hydrogen bond, with the proviso that X' and Y' are distinct; and where X' is selected from the group consisting of monoglycidyl siloxanes and monoglycidyl ether-terminated polysiloxanes, and where Y' is selected from the group consisting of N,N-diethyl amino carbonyl chloride, and 1-(3-bromopropyl)-2,2,5,5-tetramethyl-1-aza-2,5disilacyclopentane.

13. The vulcanizate of claim 1, where X' is a functionalizing agent selected from the group consisting of 1,3-dimethylimidazolidinone and N-methylpyrrolidinone, and where Y' is selected from the group consisting of isocyanato alkoxysilane compounds and epoxy-generating reagents.

14. The method of claim 7, where X' is a functionalizing agent selected from the group consisting of 1,3-dimethylimidazolidinone and N-methylpyrrolidinone, and where Y' is selected from the group consisting of isocyanato alkoxysilane compounds and epoxy-generating reagents.

* * * * *